United States Patent
Ghare

(10) Patent No.: US 11,178,197 B2
(45) Date of Patent: Nov. 16, 2021

(54) IDEMPOTENT PROCESSING OF DATA STREAMS

(71) Applicant: Amazon Technologies, Inc., Seattle, WA (US)

(72) Inventor: Gaurav D. Ghare, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 16/825,404

(22) Filed: Mar. 20, 2020

(65) Prior Publication Data

US 2020/0220910 A1     Jul. 9, 2020

Related U.S. Application Data

(63) Continuation of application No. 14/875,201, filed on Oct. 5, 2015, now Pat. No. 10,601,881.

(51) Int. Cl.
    *H04L 29/06*     (2006.01)
    *H04L 29/08*     (2006.01)
    *G06F 16/23*     (2019.01)

(52) U.S. Cl.
    CPC ...... *H04L 65/4069* (2013.01); *G06F 16/2358* (2019.01); *H04L 67/16* (2013.01)

(58) Field of Classification Search
    CPC ..... H04L 65/00; H04L 65/4069; H04L 67/16; G06F 16/2358
See application file for complete search history.

(56) References Cited

U.S. PATENT DOCUMENTS

| | | | |
|---|---|---|---|
| 6,584,581 B1 * | 6/2003 | Bay | G06F 11/1458 714/16 |
| 7,392,320 B2 | 6/2008 | Bookman et al. | |
| 7,921,328 B1 | 4/2011 | Gulati et al. | |
| 8,276,019 B2 | 9/2012 | Watanabe et al. | |
| 8,631,094 B1 | 1/2014 | Alpert et al. | |
| 8,949,801 B2 | 2/2015 | Andrade et al. | |
| 9,736,243 B2 | 8/2017 | Chablani et al. | |
| 10,601,881 B1 | 3/2020 | Ghare | |

(Continued)

OTHER PUBLICATIONS

U.S. Appl. No. 14/077,173, filed Nov. 11, 2013, Theimer, et al.
U.S. Appl. No. 14/570,937, filed Dec. 15, 2014, Meyers.
U.S. Appl. No. 14/875,194, filed Oct. 5, 2014, Ghare.

*Primary Examiner* — Minh Chau Nguyen
(74) *Attorney, Agent, or Firm* — Robert C. Kowert; Kowert, Hood, Munyon, Rankin & Goetzel, P.C.

(57) ABSTRACT

Idempotent processing of data may be implemented for data records retrieved from a data stream. A data stream may receive data records as input and distribute the ingestion, storage, and processing of the data records amongst one or more partitions of the data stream. Partition metadata may be maintained which includes checkpoint metadata for retrieving, processing, and sending data records in the data stream to a specified destination. When assigned a partition for processing, checkpoint metadata for partition may be accessed to determine whether a pending checkpoint for the partition exists. If not pending checkpoint exists, new data records may be retrieved, processed, and sent from the partition of the data stream to a specified destination. If a checkpoint is pending, then the data records identified by the checkpoint metadata as pending may be retrieved, processed, and sent to the specified destination.

20 Claims, 8 Drawing Sheets

(56) References Cited

U.S. PATENT DOCUMENTS

| | | | |
|---|---|---|---|
| 2007/0220356 A1 | 9/2007 | Ruscio et al. | |
| 2008/0177994 A1* | 7/2008 | Mayer | G06F 9/4418 713/2 |
| 2008/0270403 A1 | 10/2008 | Bookman et al. | |
| 2008/0294787 A1* | 11/2008 | Craft | G06F 11/1438 709/231 |
| 2011/0296113 A1 | 12/2011 | Elnozahy | |
| 2012/0303581 A1* | 11/2012 | Calder | G06F 16/27 707/626 |
| 2014/0317448 A1 | 10/2014 | Rash et al. | |
| 2015/0081943 A1* | 3/2015 | Larson | G06F 9/45558 710/264 |
| 2016/0103881 A1 | 4/2016 | Gukal | |

* cited by examiner

IDEMPOTENT PROCESSING OF DATA STREAMS

This application is a continuation of U.S. patent application Ser. No. 14/875,201, filed Oct. 5, 2015, which is hereby incorporated in reference herein in its entirety.

BACKGROUND

As the costs of data storage have declined over the years, and as the ability to interconnect various elements of the computing infrastructure has improved, more and more data pertaining to a wide variety of applications can potentially be collected and analyzed. For example, mobile phones can generate data indicating their locations, the applications being used by the phone users, and so on, at least some of which can be collected and analyzed in order to present customized coupons, advertisements and the like to the users. The analysis of data collected by surveillance cameras may be useful in preventing and/or solving crimes, and data collected from sensors embedded at various location within airplane engines, automobiles or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. In addition to computing platforms, some large organizations also provide various types of storage services built using virtualization technologies. Using such storage services, large amounts of data can be stored with desired durability levels.

Despite the availability of virtualized computing and/or storage resources at relatively low cost from various providers, however, the management and orchestration of the collection, storage and processing of large dynamically fluctuating streams of data remains a challenging proposition for a variety of reasons. As more resources are added to a system set up for handling large streams of data, for example, imbalances in workload between different parts of the system may arise. If left unaddressed, such imbalances may lead to severe performance problems at some resources, in addition to underutilization (and hence wastage) of other resources.

Figure 1:
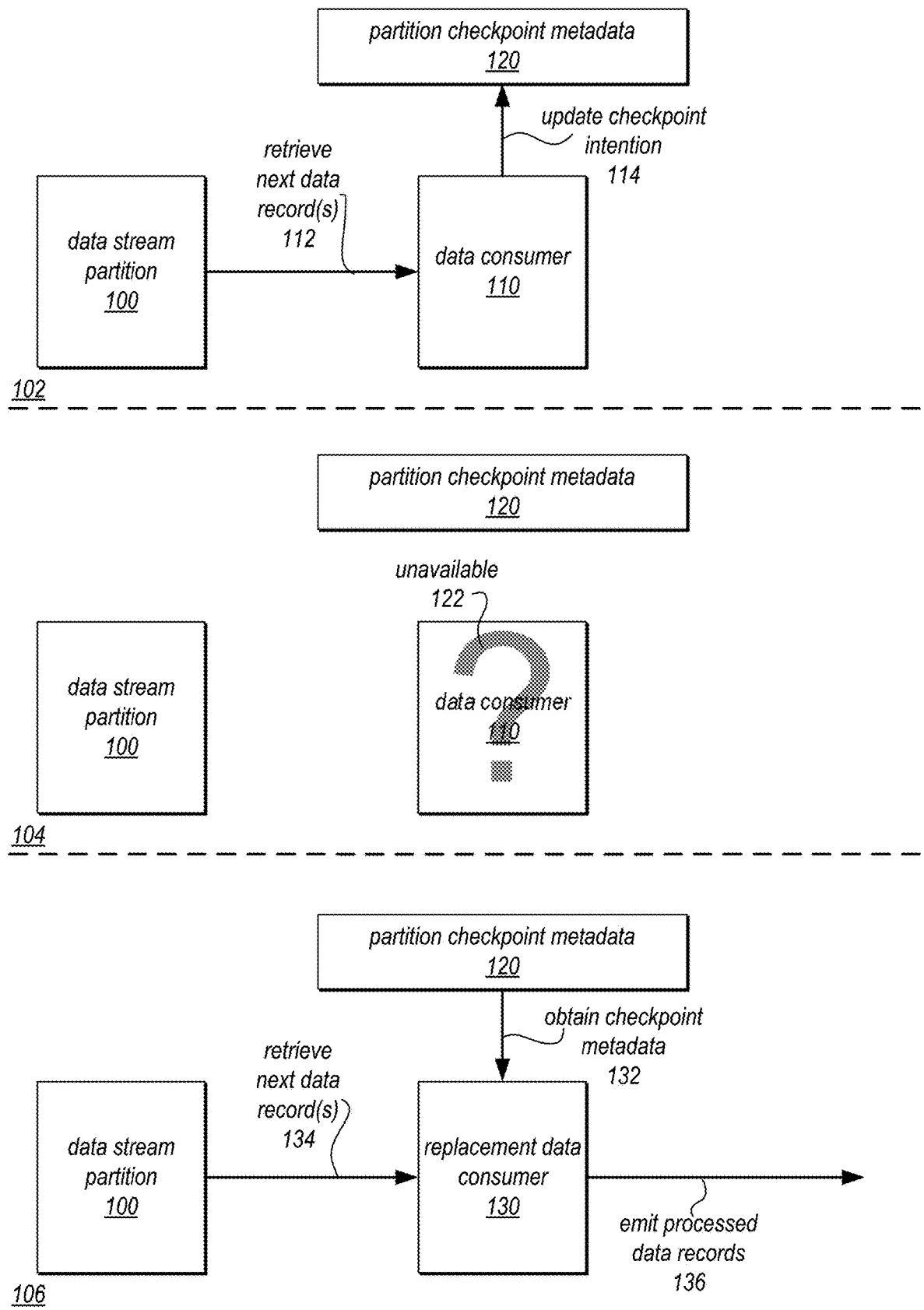
FIG. 1 is a series of block diagrams that illustrate idempotent processing of a data stream, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus to implement idempotent processing of data streams are described. The term "data stream", as used herein, refers to a sequence of data records that may be generated by one or more data producers and accessed by one or more data consumers, where each data record is assumed to be an immutable sequence of bytes. A stream management service (SMS) may provide programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. Some types of stream operations (such as stream creation or deletion, or the kinds of dynamic repartitioning operations described below) that involve interactions with SMS control components may be referred to as "control-plane" operations herein, while operations such as data record submissions, storage and retrievals that typically (e.g., under normal operating conditions) do not require interactions with control components may be referred to herein as "data-plane" operations. Dynamically provisioned sets of compute, storage and networking resources may be used to implement the service in some such embodiments, based for example on various partitioning policies that allow the stream management workload to be distributed in a scalable fashion among numerous service components, as described below in further detail. The acronym SMS may be used herein to refer to a stream management service, and also to a stream management system comprising the collection of virtual and/or physical resources used to implement a stream management service.

Some customers of the SMS may develop applications that directly invoke the SMS programmatic interfaces in various embodiments. In at least some embodiments, however, in addition to the SMS interfaces, a higher-level abstraction or application-level processing framework may be provided for customers, which may simplify various aspects of stream processing for those clients that do not wish to develop applications using the lower-level stream management functions supported by the SMS. Such a framework may provide its own programmatic interfaces (built, for example, on top of the SMS interfaces), enabling customers to focus more on the business logic to be implemented using stream records than on lower-level stream management operations. The higher-level framework may be implemented as part of the SMS to provide fully managed data stream.

Fully managed data streams may offer automated resource provisioning for stream processing, automated failovers of processing nodes, predefined processing operations for processing stream data, staged delivery of processed stream data to one or more multiple destinations. In at least some embodiments, the SMS may be implemented as a multitenant managed network-accessible service in a virtualization environment. That is, various physical resources (such as computer servers or hosts, storage devices, networking devices and the like) may at least in some cases be shared among streams of different customers in such embodiments, without necessarily making the customers aware of exactly how the resources are being shared, or even making a customer aware that a given resource is being shared at all.

In order to provide scalable storage and processing for data streams, a partitioning scheme may be implemented for a data stream, in some embodiments. Different partitions of a data stream may be implemented to manage resources of the SMS particular to the different partitions of the data stream. In order to determine the partition to which a data record put into the data stream belongs, the partitioning scheme may utilize the values of one or more attributes of the data record, in various embodiments. For example, a value of a particular attribute (which may be referred to as a partitioning attribute) of a given data record may be provided as input to a function which produces an identifier (e.g., a positive number) that can be used as a key to identify a partition for the record. The range of identifiers (e.g., 0 to $(2^{128}-1)$) that can be produced by the function may represent a "key space" of the stream, and respective ranges of the identifiers (e.g., key values) may correspond to respective partitions. Consider an example scenario in which a stream S1 of data records which include a "username" attribute as the partitioning attribute has four partitions S1-P0, S1-P1, S1-P2 and S1-P3. If the integers between 0 and 999 (inclusive) are designated as the key space for S1, the key ranges for the four partitions may initially be set to 0-249 (for S1-P0), 250-499 (for S1-P1), 500-749 (for S1-P2) and 750-299 (for S1-P3). The "username" for a given record of the stream may be mapped, e.g., using a selected hash function or some other transformation function, to a number between 0 and 999, and the partition for the record may thereby be selected based on the particular key range in which the number lies. It is noted that using a key range comprising consecutive integers may be considered one specific implementation of a more general approach to partitioning, in which each partition has an associated key set, and not all the keys of a key set may be consecutive integers. Thus, in at least some embodiments, key sets comprising at least some non-consecutive integers may be designated for one or more partitions of a stream.

Processing and delivery of data records in a data stream may be performed on a per partition basis. For example, a partition of the data stream may be assigned to a data consumer or other worker that processes data from the partition that performs one or more processing operations and then sends the data to one or more multiple destinations. As with any system, failures or changes during the course of processing and delivery of data records in a data stream can occur. For example, a compute node, or other host implementing a data consumer to retrieve, process, and send data records from a partition may fail in the middle of processing data records from the partition. A failover technique may be implemented by the SMS (or a client of the SMS—in scenarios where a client of the SMS manages processing and delivery) to ensure that processing of data records in the partition of the data stream continues with little interruption. Many failover techniques, however, are prone to introducing waste by performing redundant work that consumes additional resources. For example, if a data consumer is processing and storing data records from a partition of a stream in a data store, redundant processing of data records from the stream may result in redundant copies of the processed data records in the data store.

Idempotent processing of data streams may be implemented so that the result of processing a data record may be the same, whether the data record is processed once or multiple times. FIG. 1 illustrates a series of block diagrams that illustrate idempotent processing of a data stream, according to at least some embodiments. Scene 102 illustrates a data consumer 110 (e.g., processing worker node 334 in FIG. 3 below) that is processing data records stored and managed as part of data stream partition 100. Data consumer 110 may retrieve one or more multiple data records 112 at a time and perform various processing operations upon the data records in order to emit the data records to a desired destination (e.g., data store, analyzer, or other system that utilizes the processed data records of data stream partition 100).

Upon retrieving data records 112, data consumer 110 may update a checkpoint intention 114 that is maintained as part of partition checkpoint metadata 120. Partition checkpoint metadata 120 may be any information maintained to indicate a progress point or state of processing for the data stream partition. For example, in at least some embodiments, a checkpoint metadata may include a number of other indicator that identifies a location in the sequence of data records in the partition up to which data records have been processed (e.g., a sequence number 149,232 which indicates that data records with sequence numbers in the partition<=149,232 have been processed). The update to checkpoint metadata 114 may provide some indication of an intention to process data records 112 up to the location identified in the checkpoint metadata 120. For example, a particular flag, value, field, or other indicator may be set to identify the checkpoint value as intentional so that it may be determined based on the checkpoint metadata whether processing of the data records is pending or has been completed. In at least some embodiments, checkpoint metadata may indicate information for delivering the processed data records (e.g., a storage location in a data store).

As illustrated in scene 104, data consumer 110 has become unavailable 122 to continue processing the retrieved data records. For instance, a failure of the host implementing data consumer 110 may cause data consumer 110 to pause, shutdown, or otherwise halt processing. In some embodiments, a network partition or other communications disruption between data consumer 110 and data stream partition 100, partition checkpoint metadata 120, and/or a destination for the data records may cause data consumer 110 to be unavailable to continue processing data records. Data consumer 110 may also be reassigned to process data records for another partition or may voluntarily give up processing of the data records 112 from data stream partition 100 (e.g., due to workload or other scenario that causes data consumer 110 to have insufficient resources to process the data records).

As illustrated in scene 106, a replacement data consumer, replacement data consumer 130, may take over processing of data records from data stream partition 100. Replacement data consumer 130 may first obtain 132 partition checkpoint metadata 120. Based on the partition checkpoint metadata 120, replacement data consumer 130 may determine whether or not the data records retrieved at 112 were emitted. In this way, data records may be processed idempotently so that the data records are only delivered to a destination once. For example, an intention marker, record, or other indicator included in the update 114 to checkpoint metadata may be evaluated to detect whether the data records were emitted. A key-value store, for instance, that maps a stored data value to a unique key, may be the destination for data records emitted from data consumer 130. The checkpoint metadata may include a key value that is intended to be paired with the data record(s) emitted. Replacement data consumer 130 may send a request to the key-value store to check to see if the key exists, and if so, then it may be determined that the data records were already delivered to the key-value store. If, however, the key does not exist, then it may be determined that the data records were not delivered. Note that such a determination may be performed differently according to the destination to which the data records are bound or the marker indicator, or record included in partition checkpoint metadata to indicate the intention to process records.

Because partition checkpoint metadata 120 may include an indication of the location in the sequence of data records that can identify the records which may or may not have been processed, replacement data consumer 130 can retrieve the same data records 132 as retrieved 112 in the event that the evaluation of the metadata indicates that the data records were not processed. Replacement data consumer 130 may then process the retrieved data records 134 and emit the processed data records to one or more destinations. In some embodiments, checkpoint metadata may provide information for emitting the data records to the destination (e.g., a location in the data store), as noted above. If the evaluation of the partition checkpoint metadata 120 determines that the data records 112 were processed and emitted by data consumer 110, then replacement data consumer 134 may retrieve a next set of data records 134 from data stream partition 100, process the retrieved data records and emit 136 the processed data records.

Please note that previous descriptions are not intended to be limiting, but are merely provided as an example of idempotent processing of data streams. Different numbers of partitions, types of data consumers and destinations may be employed.

This specification begins with a general description of a provider network, which may implement a stream management service that provides idempotent processing of the data stream, either via an interface to the service for a client of the service that performs processing or managed processing of the data stream implemented as part of the stream management service. Then various examples of a stream management service are discussed, including different components/modules, or arrangements of components/module that may be employed as part of providing idempotent processing of a data stream hosted in the stream management service. A number of different methods and techniques to implement idempotent processing of data streams are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
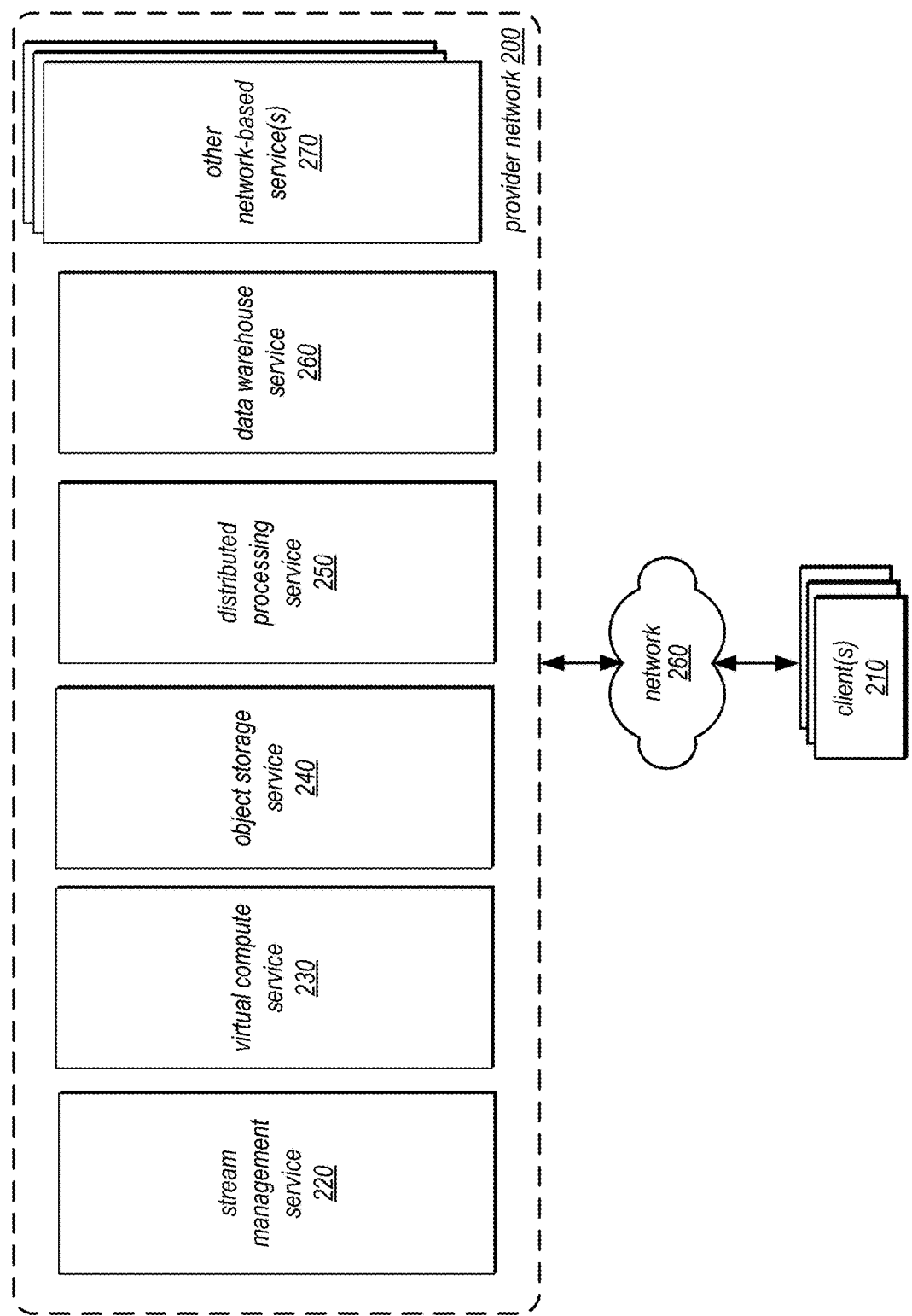
FIG. 2 is a logical block diagram illustrating a provider network that implements a stream management service that provides idempotent processing of a data stream, according to at least some embodiments.
Figure 3:
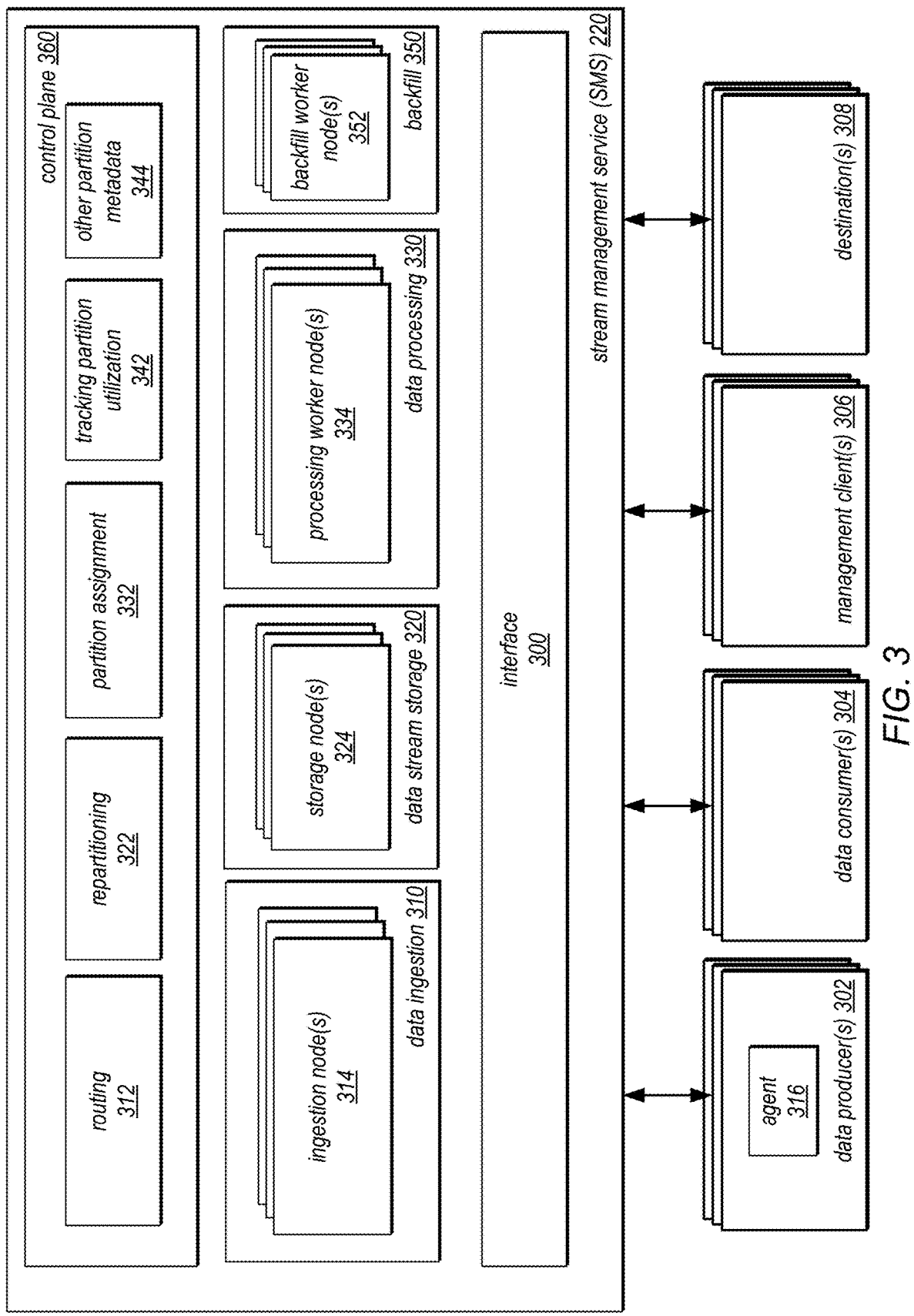
FIG. 3 is a logical block diagram of a stream management service, according to at least some embodiments.

FIG. 2 is a logical block diagram illustrating a provider network that implements a stream management service that provides idempotent processing of a data stream, according to at least some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may a stream management service 220, described in detail below with regard to FIG. 3, provide computing resources, such as virtual compute service 230, storage services, such as block-based storage service 240 and data warehouse service 260, processing services, such as distributed processing service 250, and/or any other type of network based services 270 (which may include various other types of storage, processing, analysis, communication, and security services). Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may be implemented as data producers or data consumers for a data stream managed by stream management service 220 and services such as object storage service 240, distributed processing service 250, and data warehouse service 260 may serve as destinations for data records in the data stream, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by a block-based storage service (not illustrated) in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Object storage service 240 may be implemented, in various embodiments, to provide an object-based data store that provides highly durable storage for data objects. For instance, object-based data store may be implemented as a key-value data store, where a data object is associated with a unique key. The key for the data object is used to access or manage the data object stored in object storage service 240.

Distributed processing service 250 may be implemented, in various embodiments, to provide one or more distributed processing clusters to perform processing jobs on large sets of data. For instance, a data set may be made accessible to one or more processing clusters of distributed processing service 250 on behalf of a customer in order to perform filtering and sorting of data in the data set and processing on the data in accordance with a framework that manages the operations of the cluster to run tasks in parallel, communicate and transfer data amongst nodes in the cluster, and facilitate redundancy and fault tolerance of the data and operations (e.g., as may be provided utilizing a MapReduce framework).

Data warehouse service 260 may be implemented, in various embodiments, to set up, operate, and scale a data warehouse in a cloud computing environment. Data warehouse clusters hosted by the data warehouse service 260 may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

FIG. 3 is a logical block diagram of a stream management service, according to at least some embodiments. Stream management service 220 may ingest data from one or multiple sources for a data stream, store the data in the data stream and provide access to the data for service-provided consumers or processors of the data or externally located (with respect to stream management service) consumers or processors of the data. As illustrated in FIG. 3, data ingestion 310, data stream storage 320, data processing 330, and backfill 350 may implement such functionality on behalf of SMS 220. Data producer(s) 302, management client(s) 306, and other service(s) 308, may interact with SMS 220 via interface 300. Control plane 360 may manage the provisioning, operation, networking, and other operations of the various systems in SMS 220 (e.g., provisioning and/or configuring ingestion nodes(s) 314, storage node(s) 324, processing worker node(s) 334, and backfill worker node(s) 352

Data ingestion system 310 may include one or more nodes 314 or components to ingest data. Nodes 314 of the ingestion system 310 may be configured (e.g., by nodes implementing control plane 360) to obtain data records of a particular data stream from data producers 302. Ingestion nodes 314 may obtain the data records according to a scheme for partitioning the data stream. In some embodiments, the partitioning scheme may be selected by a client of SMS for a data stream such that data records are received from data producer(s) 302 indicating the particular partition to which the data record belongs (e.g., by including a partition key as discussed above). Such data records may be directed to those ingestion node(s) 314 responsible for the particular partition (e.g., nodes assigned to the partition by partition assignment 332). However, in some embodiments, a data stream may be fully managed by SMS 220 and data producer(s) 302 may send data records without any direction for partitioning (e.g., with no partitioning key). Instead, data ingestion system 310 (in accordance with decisions performed by routing system 312) may assign data records to route the data records to ingestion node(s) 314 for the identified partition (e.g., by assigning a partition key to a data record that corresponds to the partition to which the data record is to be routed). In this way, partition utilization information (which may be tracked by partition utilization tracking 342) may inform routing decisions to ensure that each partition of a data stream is fully utilized. Then ingestion nodes 314 may pass obtained data records on to corresponding storage nodes 324 (provisioned for a partition of the data stream according to partition assignment system 332) of the data stream storage system 320. Storage node(s) 324 may record, save, store or otherwise persist the data records on any of various types of storage devices (which may be performed in accordance with a persistence policy for the data stream).

In order to process the data stream, processing worker node(s) 334 of data processing system 330 may access the storage node(s) 334 corresponding to a partition assigned to the processing worker node (e.g., assigned by partition assignment 332). In some embodiments, processing worker node(s) 324 may act as retrieval nodes that respond to read requests from data consumer(s) 304. For fully-managed data streams, processing worker nodes(s) 324 may act as data consumers, performing operations to process the data records and deliver the data records to specified destination(s) 308, such as another service in provider network 200, like object storage service 240, distributed processing service 250, data warehouse service 260, or other network-based services 270, or to a service, system, or destination outside of provider network 200. Operations to process the data records may be specified by clients, such as discussed below with regard to FIG. 4.

In at least some embodiments, data processing system 330 may provide staged processing and delivery of data in a data stream. For instance, data processing 330 may maintain a workflow, graph, data structure or other representation of multiple stages of operations to be performed or delivered with respect to a data stream. For example, processing worker node(s) 334 may be directed to perform one or more processing operations for data, send the data to another service (e.g., a storage service, such as object store 240), then send a request to another service, such as distributed processing service 250, to access the stored data in the storage service and perform specified processing operations on the data in a distributed processing cluster. The worker processing node(s) 334 may then direct that the processed data from the distributed processing cluster may be stored in data warehouse service 360. State information concerning the state of staged processing for a data stream may be maintained so that the next step or stage of processing data in the data stream may be identified. The workflow, graph, or data structure may indicate the various accounts, objects, configurations, or other information necessary to perform the desired stages. Processing worker node(s) 334 may be configured to perform the various requests, formatted to respective interfaces, such as APIs, which may instigate processing of the stage. Thus, processing worker node(s) 334 may direct the processing of data in the data stream in addition to performing processing locally, in some embodiments.

Delivery of data for managed data streams may be subject to the availability of a destination to accept the processed data from processing worker node(s) 334. In scenarios where a specified destination is unavailable, backfill system 350 may provide a storage buffer to hold processed data records for later delivery when the specified destination becomes available again. For example, a network partition or outage of the specified destination may result in a processing worker node 334 being unable to deliver data to the specified destination. Instead of blocking processing of data records in the data stream, the processed data records may be provided to backfill 350, which may poll or otherwise determine when the specified destination becomes available. Once available, backfill worker node(s) 352 may emit the processed data to the specified destination.

In order to coordinate the operation of various subsystems within SMS 220, control plane 360 may implement various management functions. For example, partition utilization tracking 342 may collect utilization data from ingestion node(s) 314, storage node(s) 324, processing worker node(s) 334, and backfill worker node(s) 352. Partition utilization data may include measures that indicate the utilization of storage (e.g., available bytes), network (e.g., available bandwidth), and processing resources (e.g., available throughput processing capacity) to perform ingestion, storage, processing and/or backfilling of data in a data stream. The partition utilization data may be aggregated or evaluated on a per partition basis in order to make various control plane determinations. For example, in at least some embodiments, routing 312 may direct data records put into a data stream by a data producer 302 to one of the partitions of a data stream based on the utilization of the different partitions of the data stream (e.g., utilization at data ingestion 310, data stream storage 320, or data processing 330). Similarly, repartitioning 322, may detect repartitioning events to modify the number (e.g., increase or decrease) of partitions in a data stream automatically (without a user request to repartition). For example, if utilization data indicates that the throughput capacity of ingestion node(s) 314, storage node(s) 324, or processing worker nodes(s) 334 assigned to the partitions of a data stream is near full utilization, repartitioning 322 may initiate a split operation for one or multiple partitions of the data stream to increase the number of partitions. Thus, partitioning 322 may managed the provisioning of additional ingestion node(s) 314, storage node(s) 324, and processing worker node(s) 334 to host or service the new partitions. Partition assignments 332 for the various ingestion node(s) 314, storage node(s) 324, processing worker node(s) 334, and backfill worker node(s) to partitions of respective data streams may be performed based on partition utilization data, whether performed upon creation of a data stream or as part of efforts to balance or redistribute the assignments of partitions in order to more efficiently utilize SMS 220 resources. Other partition metadata 344, including information describing the state of a data stream or configuration of a data stream (e.g., partitioning schemes, fully-managed or client-managed) may also be managed, maintained, and utilized by control plane 360. Other partition metadata 344 may also include checkpoint partition metadata, for performing idempotent processing of data streams, as discussed below with regard to FIG. 5.

Figure 4:
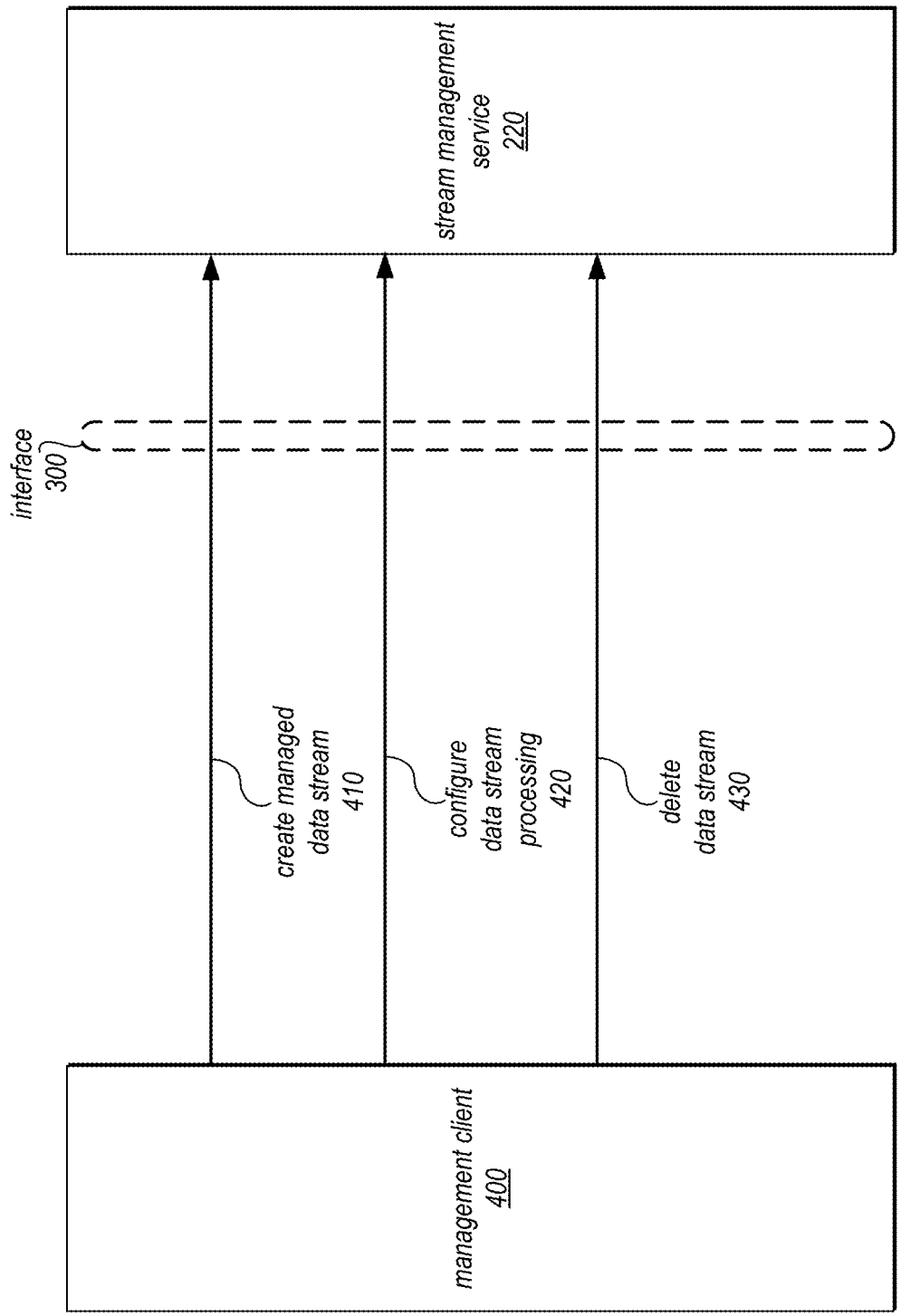
FIG. 4 illustrates interactions between a management client and a stream management service, according to at least some embodiments.
Figure 5:
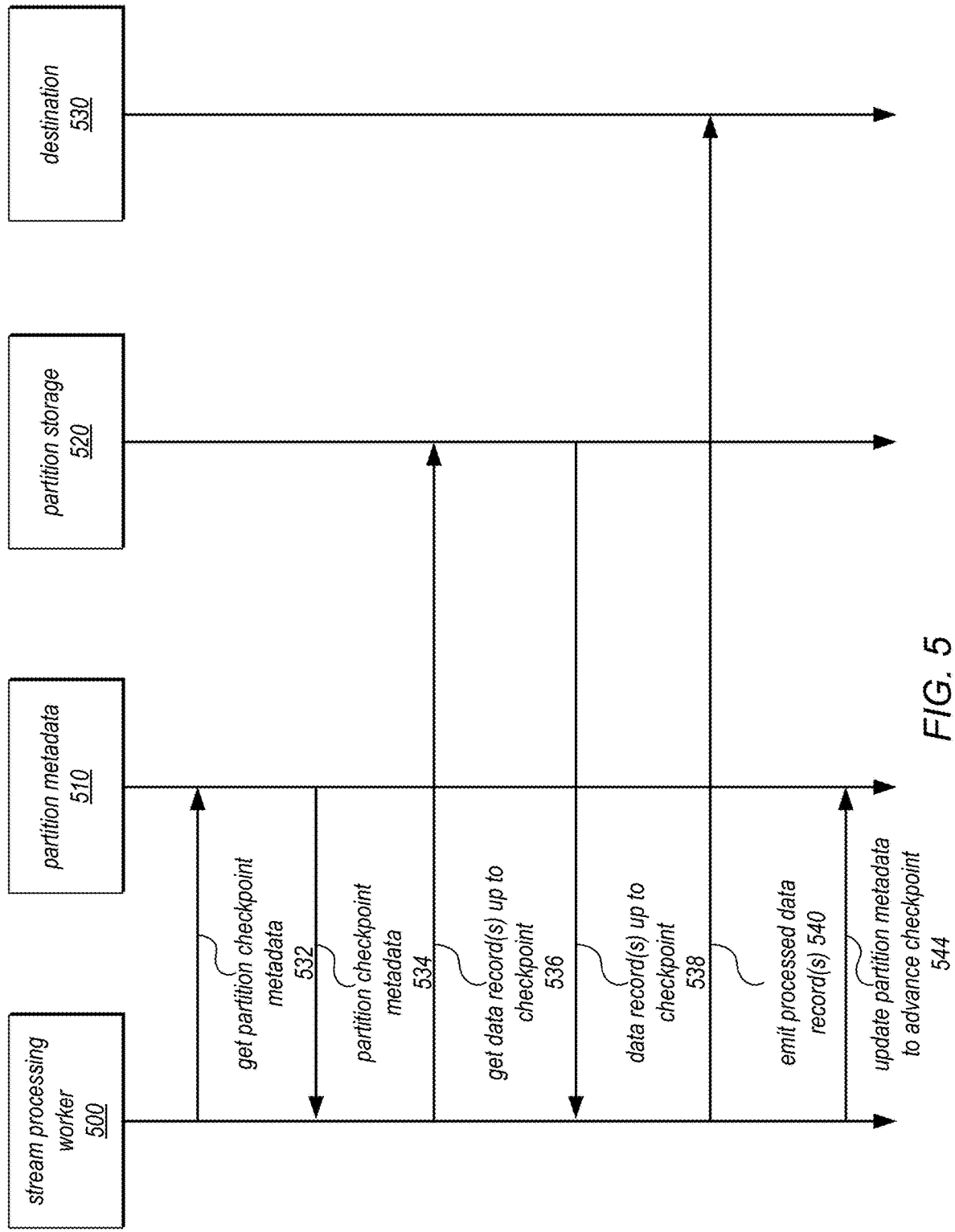
FIG. 5 is a sequence diagram illustrating interactions of a stream processing worker to perform idempotent processing of data records of a data stream, according to at least some embodiments.

Interface 300 of SMS 220 support one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. FIGS. 4 and 5, discussed below, illustrate some of the various interactions which may be performed via the programmatic interface 300 of SMS 220.

A number of different types of data producer(s) 302 may generate streams of data in different embodiments, such as, for example, mobile phone or tablet applications, sensor arrays, social media platforms, logging applications or system logging components, monitoring agents of various kinds, and so on. In order to reduce the burden of configuring or managing the interaction of data producer(s) 302 and SMS 220, some data producer(s) 302 may host or implement an agent 326 provided by SMS 220. Agent 326 may be an application, driver, or other component that may be obtained from SMS 220 (e.g., via a download) and installed upon a data producer 302. When a new data record is generated by the data producer, agent 316 may detect the new data record, format the data record for transport to SMS 220, and send via interface 300 the data record to SMS 220 to be put into the data stream (e.g., via a "putRecord" request). In this way, data producers need not develop an application to make user of interface 330 to put data records into a data stream at SMS 220, but instead may rely upon obtaining agent 316 to appropriately upload the data record.

For client-managed data streams, data consumer(s) 304 which are implemented separately from SMS 220 may be configured to access SMS 220 via interface 300. For example, data consumer(s) 304 may implement a client library provided by SMS 220 to utilize requests, such as "getNextRecords" when executing an application to retrieve the next data records to be processed in the data stream. The various techniques discussed below with regard to FIGS. 6 and 7 to perform idempotent processing of data streams may be performed by data consumer(s) 304 or processing worker node(s) 334 (which may perform data consumption for fully managed data streams).

Management client(s) 306 may be like client(s) 210 in FIG. 2, which may interact with SMS 220 via interface 300 in order to create, manage, and/or remove data streams. FIG. 4 illustrates interactions between a management client and a stream management service, according to at least some embodiments. A managed data stream may provide end to end management of a data stream, including detection of data records for a data stream, upload of data records into the data stream, retrieval and processing of data records from the data stream and delivery of the processed data records to one or multiple destinations. Management client 400 may send a request to create a managed data 410 to SMS 220 via interface 300. The request may specify performance characteristics of the data stream (e.g., size of data stream or throughput rate of data through the data stream). The request may specify a buffer limit or rate at which data records are retrieved from the data stream for processing and delivery. For example, the buffer limit may be specified in terms of the amount of time data records may be buffered (e.g., retrieve data records from a stream at a stream processing worker node until a time period expires, then process and emit the data records), the size of data records that may be buffered (e.g., retrieve data records until the total size of data records equals 10 MB), or the number of records that may be buffered (e.g., retrieve up to 50 data records for processing at a time). In some embodiments, the buffer limit may be determined based on a specified destination. For example, if data records are being delivered to a destination that implements a particular distribution scheme, then the number of data records indicated by the buffer limit may allow for the data records to be efficiently distributed or processed at the destination according to the particular distribution scheme. The request may also specify the destination(s) for delivering the processed data records (including instructions, keys, tokens, or other information necessary for delivery the data records). Although not illustrated, in some embodiments a separate request to change the specified destination may occur while the data stream is actively ingesting, storing, processing, or emitting data records.

A request to configure data stream processing 420 may also be sent via interface 300 to SMS 220. The request 420 may specify processing operations to perform. For example, one or more operations of a pre-defined set of operations may be available for selection in the creation request 410. In at least some embodiments, operations may include, but are not limited to, compressing the data records (e.g., according to one or more techniques, such as run-length encoding, Lempel-Ziv, and/or grammar-based encoding), encrypting the data records (e.g., utilizing a public-private key pair encryption mechanism), filtering the data records (e.g., to remove extraneous or unwanted data records), or reformatting data records (e.g., converting data records with data formatted in JavaScript Object Notation (JSON) to comma separated values (CSV), or vice versa). In some embodiments, request 420 may include source code or an executable to be implemented at a stream processing worker in order to perform processing operations with respect to retrieved data records. As discussed above, processing of a managed data stream may also be staged so that multiple destinations and/or operations are utilized to process data records retrieved from a data stream. Request 420 may provide a workflow or other set of instructions to perform the staged operations with respect to the data stream.

A request to delete the data stream 430 may also be sent to SMS 220 via interface 300. SMS 220 may halt processing of the data stream and delete data records in process or hold deletion until all data records in the data stream are processed. SMS 220 may then release the resources provisioned for the data stream (e.g., ingestion node(s) 314, storage node(s) 324, and processing worker node(s) 334) to be provisioned or assigned for other data streams.

Typically, a stream processing worker may retrieve data records of a partition for processing. The stream processing worker may update partition checkpoint metadata for the partition to indicate the intention to process the retrieved records. Once processing and emitting of the retrieved records is successfully completed, then the stream processing worker may update the partition checkpoint metadata to indicate that processing of the records is completed. As discussed above in FIG. 1, idempotent processing of a data stream may rely upon the partition checkpoint metadata to determine whether or not data records retrieved by a stream processing worker have been emitted to a destination. In this way, another stream processing worker that assumes responsibility for processing the data records may not reprocess and emit data records that have already been processed and emitted. FIG. 5 is a sequence diagram illustrating interactions of a stream processing worker to perform idempotent processing of data records of a data stream, according to at least some embodiments.

Upon assignment of a partition of a data stream, stream processing worker 500 may send a request 532 to get partition checkpoint metadata from partition metadata 510. Based on the received partition checkpoint metadata 534, stream processing worker 500 may determine whether data records identified in the checkpoint metadata were emitted or processed. If not, then stream processing worker 500 may send a request to get the indicated data record(s) 536 from partition storage 520. Stream processing worker 500 may then process the received data record(s) 538 and emit 540 the processed data records to the specified destination 530. Upon successfully processing and emitting the data records, stream processing worker 500 may update partition metadata to advance the checkpoint 544 to indicate that processing and emission of the data records up to the checkpoint is successfully completed.

The examples of idempotent processing of data streams as discussed above with regard to FIGS. 2-5 have been given in regard to a stream management service and/or other network-based services. Various other types or configurations of distributed systems processing data from a data stream may implement these techniques. For example, large-scale distributed environments operated by a single business entity may implement idempotent processing of data streams for its own applications. Moreover, different configurations of the various modules, components, systems, and or services described above that may implement idempotent processing of data streams may be configured to perform idempotent processing of data streams. Thus the stream management service discussed above serves as one example context in which many of the stream management and processing techniques described herein may be implemented. However, the techniques discussed below with regard to FIGS. 6 and 7 may be also implemented using stream processing worker(s) as discussed above.

Figure 6:
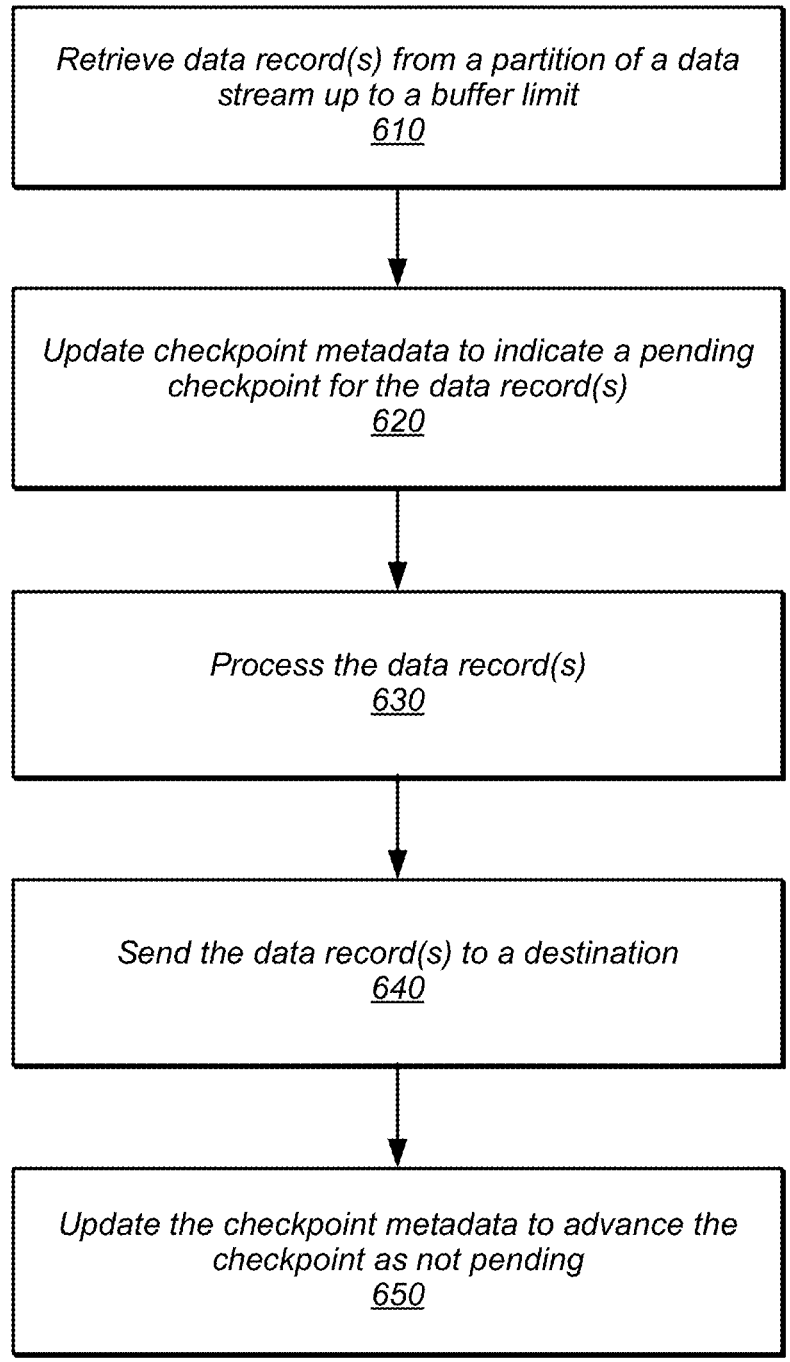
FIG. 6 is a high-level flowchart illustrating various methods and techniques to update checkpoint metadata when processing a data stream, according to at least some embodiments.

FIG. 6 is a high-level flowchart illustrating various methods and techniques to update checkpoint metadata when processing a data stream, according to at least some embodiments. As indicated at 610, data record(s) may be retrieved from a partition of a data stream up to a buffer limit 610 at a stream processing worker (implemented as part of a stream management service or as part of a client application). A retrieve request may be sent to storage nodes (or processing working worker nodes that handle retrieve requests). The request may specify a number of data records to retrieve, or may retrieve all available records (within the buffer limit). The buffer limit, as discussed above, may limit the number of records that may be processed and emitted at a time. For example, if the buffer limit is time-based, then the retrieval of data records may occur until the time limit for buffering data records is expired. If determined by the size or number of data records, then retrieval may occur until the limit is reached by the total size of records or total number of records retrieved.

As indicated at 620, checkpoint metadata for the partition may be updated to indicate a pending checkpoint for the data records. Checkpoint metadata may be updated to indicate a pending checkpoint in many ways. For example, a checkpoint for the data records may be stored as a location or point in the sequence of data records (e.g., a sequence number) which indicates the point in the sequence of data records in the partition of the data stream at which log records have been retrieved and processed. A marker or other indication may also be included in the checkpoint metadata which may indicate that the checkpoint is pending or complete. In some embodiments, the checkpoint metadata may include data to ensure that any processing or emission of data records is overwritten or not repeated. For instance, the delivery destination may be a data store and the checkpoint metadata for the partition may include a location in the data store at which the data records are to be written. Using this location, partially emitted data records may be over written in the same location so that the result of processing the data records utilizing the checkpoint metadata is idempotent (because the state of the data records in the data store is the same based on the first attempt to perform or the later successful attempt to process the records).

As indicated at 630, the data records may be processed. Processing of the data records may include different operations. In embodiments where the data stream is fully managed, the processing operations may be specified by a client and performed by the stream management system or service (as opposed to a client implementation of processing the data records). Processing operations that may be specified for a managed data stream include filtering data records out of the data stream, converting data records from one format to another, encrypting data records, or compressing the data records. Other operations may be specified or provided by uploading source code, an executable or other set of instructions, in some embodiments, for performance. Once processed the data record(s) may be sent to the specified destination, as indicated at 640.

Upon successful completion of processing and sending the data record(s), the checkpoint metadata may be updated to identify the checkpoint as not pending (e.g., complete), as indicated at 650. A confirmation or acknowledgement of delivery of the data records may be received at a stream processing worker (implemented as part of a stream management service or as part of a client application). The update to the checkpoint metadata may modify the checkpoint metadata in some way as to indicate that the checkpoint completed. For example, checkpoint metadata may be formatted as log so a new log entry may be written that indicates that the checkpoint is complete. In some embodiments, to indicate that the checkpoint is pending, markers or data indicative of a pending checkpoint may be removed. In the example given above of a delivery destination in a data store, the delivery destination may be removed, which may indicate to a reader of the checkpoint metadata for the partition that the checkpoint is no longer pending as no information is provided to continue processing the records covered by the checkpoint.

Figure 7:
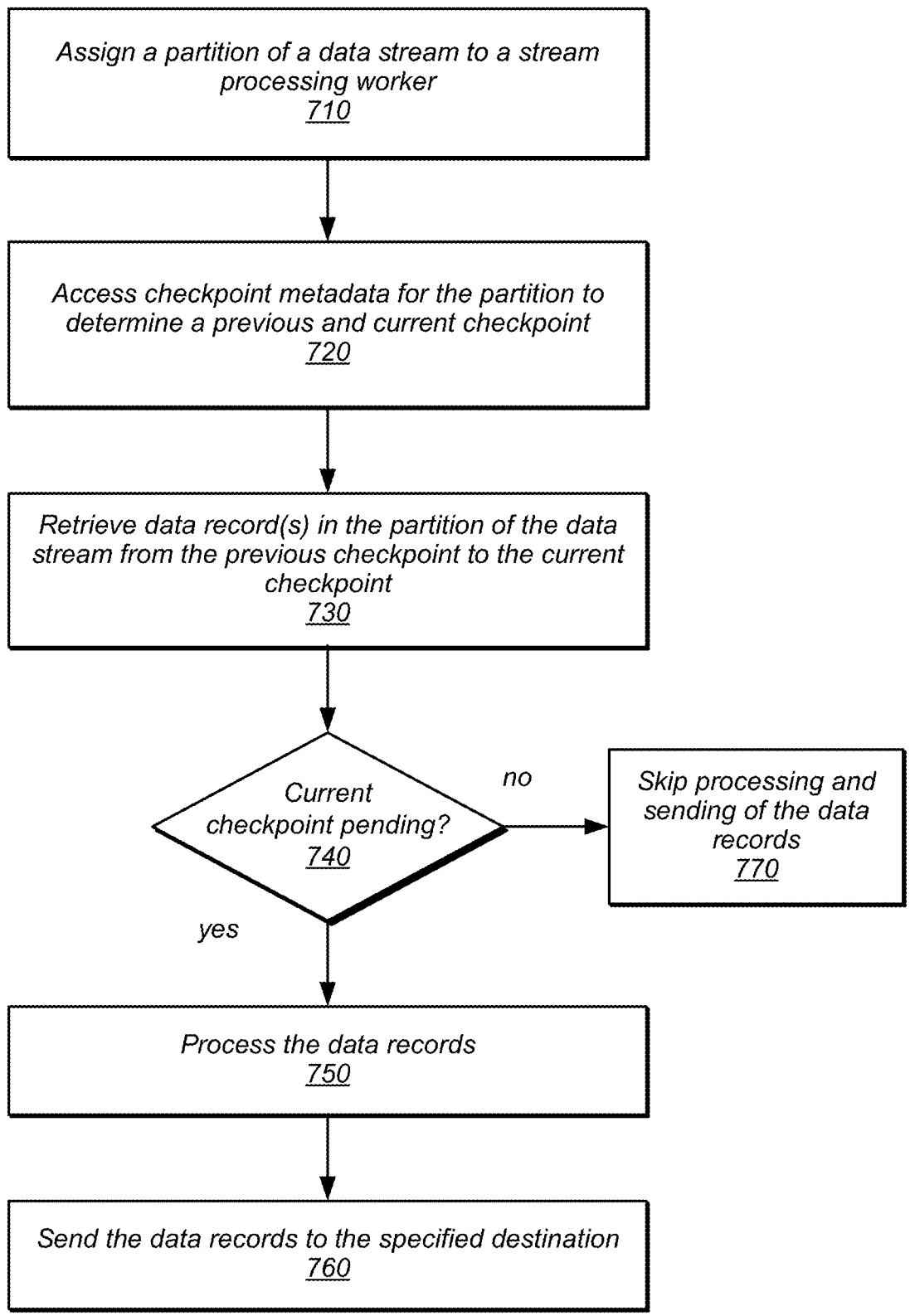
FIG. 7 is a high-level flowchart illustrating various methods and techniques to perform idempotent processing of a data stream, according to at least some embodiments.

Different failures or scenarios can trigger a change in responsibility for processing data records for a partition of a data stream. Normally, a stream processing worker (or client application) would continually perform the technique illustrated in FIG. 6. However, if the stream processing worker is removed from processing the data records for the partition, a new stream processing worker may have to determine whether the previous stream processing worker completed processing a set of retrieved data records (or not) so as not to cause duplicate processing and/or emission of data records. FIG. 7 is a high-level flowchart illustrating various methods and techniques to perform idempotent processing of a data stream, according to at least some embodiments.

As indicated at 710, a partition of a data stream may be assigned to a stream processing worker, in various embodiments. Assignment may occur as a result of a failure of a previous stream processing worker assigned to the partition (or some other cause to move assignment of the partition to the stream processing worker, such as part of load balancing operation performed for stream processing workers that process data records from multiple different partitions). Once assigned, checkpoint metadata for the partition may be accessed to determine a previous and current checkpoint. For example, the checkpoint metadata may include a current checkpoint (which may or may not be pending) and a previous checkpoint (which indicates data records that have been processed and emitted). In at least some embodiments, the current checkpoint and the previous checkpoint may be represented as sequence numbers so as to indicate a range of sequence numbers that may be retrieved.

As indicated at 730, the data record(s) in the partition of the data stream from the previous checkpoint to the current checkpoint may be retrieved, in some embodiments. One or more retrieval requests, for instance, may be sent to storage nodes or to a stream management system to retrieve the identified data records. As indicated at 740, a determination may be made as to whether the current checkpoint is pending. For example based on the checkpoint metadata. For example, the checkpoint metadata may include a key that indicates a location in a key value data store that serves as a destination for data records in the partition of the data stream. A request may be sent to the key-value data store to determine whether the key value exists. If the key exists, then the key value data store was already received the data records described in the checkpoint metadata (and therefore it may be inferred that reassignment of the partition occurred after completion but before the checkpoint metadata could be updated to indicate that the checkpoint is no longer pending). In some embodiments, other data, markers, indicators, or codes may be included in the checkpoint metadata for the partition which may be evaluated or used to determine whether the data records have been successfully processed and emitted. For example, a transaction id may be in the metadata may be compared with data values in a database table stored in a database that serves as the destination, and if it exists, then it may be determined that the current checkpoint is not pending. The transaction table may be stored in addition to a table that stores the data records retrieved from the data stream.

If the current checkpoint is not pending, then the retrieved data record(s) may be skipped (as they have already been processed and emitted, as indicated at 770. Next data records may then be retrieved, as discussed at 610 in FIG. 6 above. If, however, the current checkpoint is pending, then the data records may be processed as indicated at 750 and sent to the specified destination for the data records, as indicated at 760. Although not illustrated, like in FIG. 6 above, the checkpoint metadata may then be updated to reflect successful completion of processing and sending the records.

The techniques described above may be useful in a number of scenarios. For example, large provider networks may comprise thousands of instance hosts implementing service instances of a number of different multi-tenant or single-tenant services for tens of thousands of clients simultaneously. Monitoring and/or billing agents installed on the various instances and hosts may rapidly generate thousands of metric records, which may need to be stored and analyzed to produce accurate billing records, to determine effective provisioning plans for the data centers of the provider network, to detect network attacks, and the like. The monitoring records may form an input stream to an SMS for scalable ingestion and storage, and the idempotent processing techniques described may be implemented for the analysis of the collected metrics. Similarly, applications to collect and analyze large numbers of log records from numerous log sources (e.g., application logs from the nodes of a distributed application, or system logs from the hosts or compute instances at a data center) may also be able to utilize SMS and idempotent processing functionality. In at least some environments, the processing operations for data records may comprise a real-time ETL (Extract-Transform-Load) processing operation (i.e., an operation that transforms received data records in real time for loading into a destination, instead of doing the transformation offline), or a transformation of data records for insertion into a data warehouse. Using a data stream for loading data into a data warehouse in real time may avoid the delays that are typically required to clean and curate data from one or more data sources, before the data can be inserted into a warehouse for analysis.

A number of different "big data" applications may also be built using the SMS and processing techniques. For example, the analysis of trends in various forms of social media interactions may be performed efficiently using streams. Data collected from mobile phones or tablet computers, such as location information of the users, may be managed as stream records. Audio or video information, collected for example from a fleet of monitoring cameras may represent another category of streaming data set that could be collected and processed in a scalable manner, potentially helping prevent attacks of various kinds. Scientific applications that require analysis of ever-growing data sets, collected for example from weather satellites, ocean-based sensors, forest-based sensors, astronomical telescopes, may also benefit from the stream management and processing capabilities described herein.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 8:
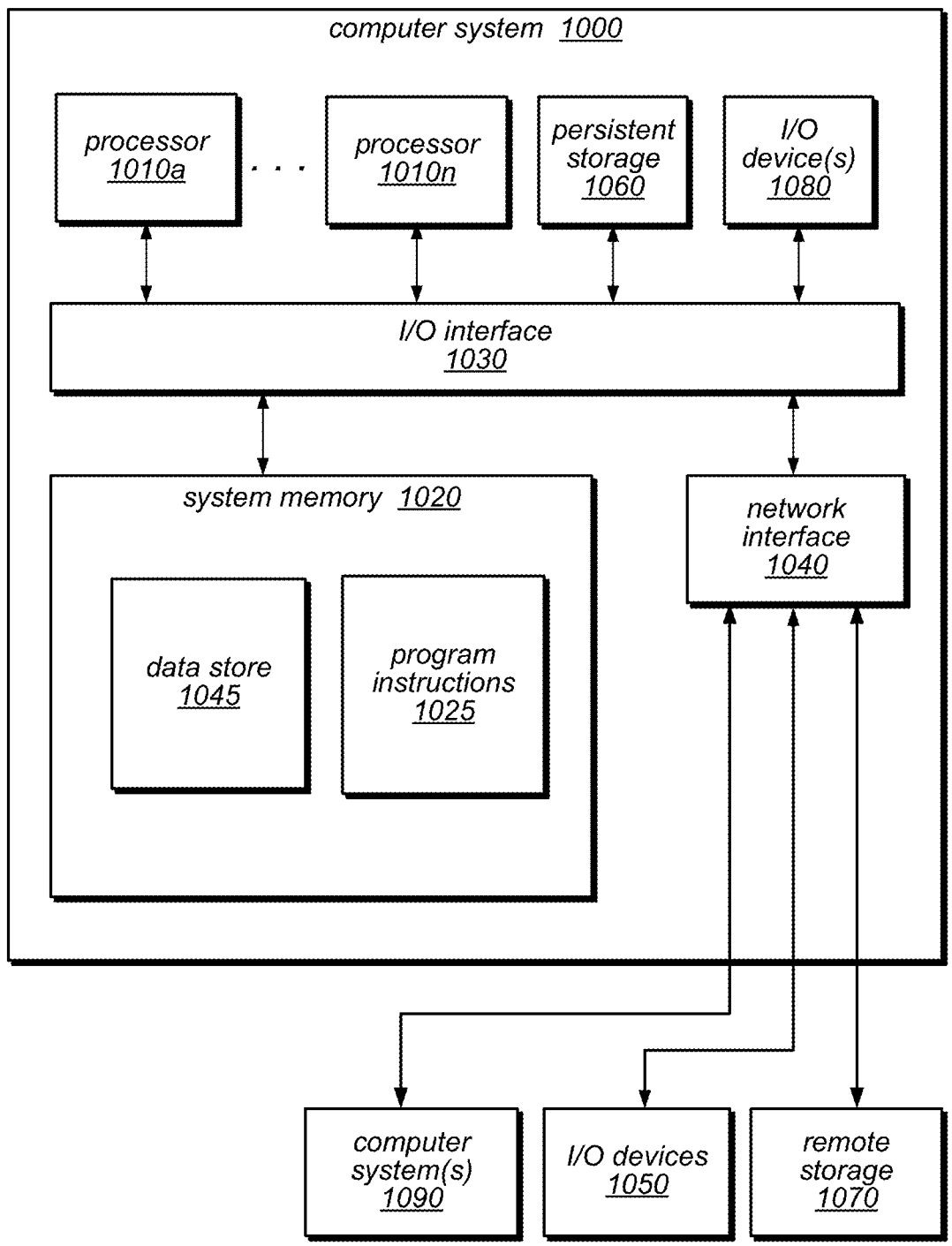
FIG. 8 is a block diagram illustrating an example computing system that may be used in at least some embodiments.

Embodiments of idempotent processing of data streams as described herein may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI)

bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a stream management service, the stream management service configured to:
   retrieve, by a first stream processing worker of the stream management service, one or more data records from a partition of a data stream assigned by the stream management service to the stream processing worker, the one or more data records retrieved up to a buffer limit;
   update, by the first stream processing worker, checkpoint metadata for the partition of the data stream to indicate a pending checkpoint for the data records, the pending checkpoint indicating that the one or more data records are to be processed instead of skipped if a second stream processing worker is assigned to the partition of the data stream by the stream management service to replace the first stream processing worker; and
   after sending the one or more data records processed by the first stream processing worker to a destination, update, by the first stream processing worker, the checkpoint metadata to advance the checkpoint as not pending, the not pending checkpoint indicating that the one or more data records are to be skipped if the second stream processing worker is assigned by the stream management service to the partition of the data stream to replace the first stream processing worker.

2. The system of claim 1, wherein the update to the checkpoint metadata for the partition of the data stream to indicate the pending checkpoint for the data records includes, in the checkpoint metadata, a location to store the one or more data records in the destination.

3. The system of claim 2, wherein the update to the checkpoint metadata to advance the checkpoint as not pending removes, from the checkpoint metadata, the location to store the one or more data records in the destination.

4. The system of claim 1, wherein the update to the checkpoint metadata to advance the checkpoint as not pending is performed responsive to receiving an acknowledgement from the destination that the one or more data records are stored.

5. The system of claim 1, wherein the buffer limit is specified via a request received via an interface for the stream management service.

6. The system of claim 1, wherein the data stream is a managed data stream, wherein the partition is one of a number of partitions dynamically determined for the managed data stream in response to receiving a request to create the managed data stream.

7. The system of claim 1, wherein the stream management service is further configured to access, by the first stream processing worker, the checkpoint metadata to identify the one or more data records to process and send to the specified destination.

8. A method, comprising:
retrieving, by a first stream processing worker of a stream management service, one or more data records from a partition of a data stream assigned by the stream management service to the stream processing worker, the one or more data records retrieved up to a buffer limit;
updating, by the first stream processing worker, checkpoint metadata for the partition of the data stream to indicate a pending checkpoint for the data records, the pending checkpoint indicating that the one or more data records are to be processed instead of skipped if a second stream processing worker is assigned to the partition of the data stream by the stream management service to replace the first stream processing worker; and
after sending the one or more data records processed by the first stream processing worker to a destination, updating, by the first stream processing worker, the checkpoint metadata to advance the checkpoint as not pending, the not pending checkpoint indicating that the one or more data records are to be skipped if the second stream processing worker is assigned by the stream management service to the partition of the data stream to replace the first stream processing worker.

9. The method of claim 8, wherein updating the checkpoint metadata for the partition of the data stream to indicate the pending checkpoint for the data records includes, in the checkpoint metadata, a location to store the one or more data records in the destination.

10. The method of claim 9, wherein the update to the checkpoint metadata to advance the checkpoint as not pending removes, from the checkpoint metadata, the location to store the one or more data records in the destination.

11. The method of claim 8, wherein the update to the checkpoint metadata to advance the checkpoint as not pending is performed responsive to receiving an acknowledgement from the destination that the one or more data records are stored.

12. The method of claim 8, wherein the buffer limit is specified via a request received via an interface for the stream management service.

13. The method of claim 8, wherein the data stream is a managed data stream, wherein the partition is one of a number of partitions dynamically determined for the managed data stream in response to receiving a request to create the managed data stream.

14. The method of claim 8, further comprising accessing, by the first stream processing worker, the checkpoint metadata to identify the one or more data records to process and send to the specified destination.

15. One or more non-transitory, computer-readable storage media, storing program instructions that when executed on or across one or more computing devices cause the one or more computing devices to implement:
retrieving, by a first stream processing worker of a stream management service, one or more data records from a partition of a data stream assigned by the stream management service to the stream processing worker, the one or more data records retrieved up to a buffer limit;
updating, by the first stream processing worker, checkpoint metadata for the partition of the data stream to indicate a pending checkpoint for the data records, the pending checkpoint indicating that the one or more data records are to be processed instead of skipped if a second stream processing worker is assigned by the stream management service to the partition of the data stream to replace the first stream processing worker; and
after sending the one or more data records processed by the first stream processing worker to a destination, updating, by the first stream processing worker, the checkpoint metadata to advance the checkpoint as not pending, the not pending checkpoint indicating that the one or more data records are to be skipped if the second stream processing worker is assigned by the stream management service to the partition of the data stream to replace the first stream processing worker.

16. The one or more non-transitory, computer-readable storage media of claim 15, wherein updating the checkpoint metadata for the partition of the data stream to indicate the pending checkpoint for the data records includes, in the checkpoint metadata, a location to store the one or more data records in the destination.

17. The one or more non-transitory, computer-readable storage media of claim 16, wherein the update to the checkpoint metadata to advance the checkpoint as not pending removes, from the checkpoint metadata, the location to store the one or more data records in the destination.

18. The one or more non-transitory, computer-readable storage media of claim 15, wherein the update to the checkpoint metadata to advance the checkpoint as not pending is performed responsive to receiving an acknowledgement from the destination that the one or more data records are stored.

19. The one or more non-transitory, computer-readable storage media of claim 15, wherein the data stream is a managed data stream, wherein the partition is one of a number of partitions dynamically determined for the managed data stream in response to receiving a request to create the managed data stream.

20. The one or more non-transitory, computer-readable storage media of claim 15, storing further instructions that when executed on or across the one or more computing devices, cause the one or more computing devices to implement accessing, by the first stream processing worker, the checkpoint metadata to identify the one or more data records to process and send to the specified destination.

* * * * *